United States Patent [19]
Issel et al.

[11] Patent Number: 5,472,492
[45] Date of Patent: Dec. 5, 1995

[54] ORGANIC AZO-PIGMENT COATED LITHOPONE

[75] Inventors: Michael T. Issel, Emeryville, Calif.; Derek W. Bannister, Toms River, N.J.; Shao H. Long, Guangzhou, China; Quilin Wang, Guangzhou, China; Xiang L. Zhong, Guangzhou, China; Guiping Xiao, Guangzhou, China

[73] Assignees: Sino-American Pigment Systems, Inc., Inc., Emeryville, Calif.; Guangzhou Hauli Pigment Chemical Industrial Co., Guangzhou, China

[21] Appl. No.: 201,694

[22] Filed: Feb. 25, 1994

[51] Int. Cl.$^6$ .................................................. C09C 1/04
[52] U.S. Cl. ..................... 106/423; 106/402; 106/422; 106/496; 404/72; 427/136
[58] Field of Search ..................... 106/421, 422, 106/423, 496, 402; 427/136; 404/72

[56] References Cited

U.S. PATENT DOCUMENTS 5,127,952  7/1992  Persello et al. ........................ 106/457

*Primary Examiner*—Mark L. Bell
*Assistant Examiner*—Scott L. Hertzog
*Attorney, Agent, or Firm*—Flehr, Hohbach, Test, Albritton & Herbert

[57] ABSTRACT

The invention relates to extended, organic pigments, their method of manufacture and their use in paint formulations, particularly those suitable for road or traffic markings. The subject pigments typically comprise a particulate lithopone core coated with a layer of an organic pigment. According to preferred embodiments, the pigment comprises an azo compound, the pigments are rosinated, and/or the core also contains a colorant or doping material, typically a metal oxide or metal salt. An exemplary method involves mixing particulate lithopone with a coupler such as acetoacet-o-anisidide. A coupler precipitator, typically an acidifier, is then added in an amount sufficient to precipitate the coupler onto the lithopone. The lithopone-bound coupler is then reacted with a diazonium ion in an azo-coupling reaction to form a pigment. The pigment-coated lithopone particles may then be heated and coated with a rosin or modified rosin soap.

20 Claims, No Drawings

ORGANIC AZO-PIGMENT COATED LITHOPONE

BACKGROUND

The field of the invention is extended organic paint pigments, especially their use in road marking paints.

Extended pigment compositions may be prepared by mixing pigment with an inert substrate, such as barium sulfate, titanium dioxide, talc, etc. and then modifying the surface properties by treating the extended pigment with a rosin soap. However, such extended, rosinated pigments as are available are lacking in important properties, such as hiding power, light fastness, and scrub resistance; or they have high oil absorbency. The latter property is of particular concern at the present time, as regulations are being imposed to limit the amounts of solvents in paints which are released to the atmosphere as volatile organic pollutants during drying of the paint films. Furthermore, commonly used pigments such as lead chromate are facing increasing use restrictions because of their toxicity.

Persello et al. (1992) U.S. Pat. No. 5,127,952 relates to core/oxide/dye pigmentary colorants; Watanabe et al. (1976) U.S. Pat. No. 3,935,158 and Masuda et al. (1981) U.S. Pat. No. 4,301,050 related road making compositions; Proux (1962) U.S. Pat. No. 3,051,590, Pojurowski et al. (1963) U.S. Pat. No. 3,092,507 and Flasch (1961) U.S. Pat. No 3,002,846 relate to uses of coating compositions involving lithopone.

SUMMARY OF THE INVENTION

This invention relates to extended, organic pigments, their method of manufacture and their use in paint, ink, adhesive, elastomer and rubber formulations, particularly those suitable for road or traffic markings. Inorganic core particles, preferably particulate lithopone, are coated with a layer of an organic pigment, preferably an azo pigment. The extened pigments are optionally rosinated, and/or the core optionally contains a colorant or doping material, typically a metal oxide, especially titanium dioxide, or metal salt, such as cadmium sulfide.

The invention encompasses methods of making extended pigments and compositions produced by such methods. The extended pigments are made by precipitating or forming an organic pigment on an inorganic particulate core. An exemplary method involves mixing particulate lithopone with a coupler such as acetoacet-o-anisidide. A coupler precipitator, typically an acidifier, is then added in an amount sufficient to precipitate the coupler onto the lithopone. The lithopone-bound coupler is then reacted with a diazonium ion in a azo-coupling reaction to form a pigment. The pigment-coated lithopone particles may then be heat treated and coated with a rosin or modified rosin soap.

DESCRIPTION OF SPECIFIC EMBODIMENTS

The invention provides extended, organic pigments, their method of manufacture and their use in paint formulations, particularly those suitable for road or traffic markings.

The compositions comprise a particulate inert substrate core coated with a layer of an organic pigment. As used herein, the term pigment refers to a colorant which retains a crystalline structure during application. In contrast, a dye loses its crystalline structure during application. According to a preferred embodiment, the pigments are azo pigments formed by precipitating a coupler onto a particulate inorganic core, preferably lithopone, and forming the pigment on the core by an azo-coupling reaction between the core-bound coupler and a diazonium ion. In another embodiment, the invention provides lithophone lakes produced by forming a toner on a lithopone core by precipitating a soluble dye with calcium or barium ions. Generally, pigments will require an adhesive, e.g. rosin, to remain bound to the selected core under ordinary working (field) conditions.

The core is selected to be photo and chemically and physically compatible with the pigment coating process, the selected pigment and the intended application. For example, the core should not be adversely affected in terms of structure, chemical reactivity, oil absorptivity, etc. by the solvents, pH ranges, and temperatures encountered during the selected coating process. Similarly, the chemical composition of the core is selected for binding stability to the selected pigment under anticipated environmental conditions. Finally, the core composition, size and structure are selected to optimize performance under working conditions. For example, under some applications, e.g. traffic paint, properties such as light fastness, hiding power, low oil absorptivity, etc. are maximized.

Desirably, the opacity or the core is enhanced or the core is color coordinated for the selected pigment. In this way, the weight fraction of relatively expensive organic pigment may be minimized and/or additional color/shades may be obtained by selected core-pigment combinations. As examples, core opacity may be enhanced by a major core constituent (e.g. titanium dioxide), the inclusion of additional compounds or modifying the crystal by including for instance, air pockets which raise the refractive index of the particle. Similarly, color may be provided by a major core component such as a metal oxide, metal salt or by inclusion of a supplemental colorant, doping agent or other material to alter the refractive index of the core i.e. by the inclusion of certain other materials, for example, a metal oxide (e.g. titanium dioxide), cobalt, etc. e.g. during the calcining process.

A wide variety of extender substrates may be used in the subject cores, principle considerations being size, structural, photo and chemical compatibility with the coating process, pigment and applications, as well as cost and availability. Suitable core substrates include silicates, sulfates, oxides and carbonates of metals, especially of the alkaline earth metals, particularly calcium, barium, zinc and magnesium, more particularly zinc sulfide and barium sulfate. A preferred core comprises lithopone which may be pure, calcined, zinc sulfide/barium sulfate or it may be titanated. Lithopone is particularly cost-effective and when used with certain pigments desribed herein, provide an extended pigment with exceptional hiding power, low oil absorbtivity, etc. The lithopones typically have compositions ranging from about 15–40%, preferably about 20–30%, zinc sulfide and about 40–80%, preferably about 50–70% barium sulfate. Advantageously, these cores may also include titanium dioxide to enhance opacity, typically in the range of about 1–30%, preferably about 5–25%. A preferred composition is about 15–30%, more preferably about 20% zinc sulfide, about 50–65%, more preferably about 57% barium sulfate, and about 5–25%, more preferably about 23% titanium dioxide.

The subject core particles are coated with a layer of an organic pigment. By coated is meant that the pigment is primarily located directly on the surface or periphery of the core particle. It is desirable to provide the coating layer as evenly, continuously and homogeneously as is cost effective, though uneven, discontinuous, non-homogeneous layers can also provide useful compositions. According to a preferred embodiment, the coating layer is of sufficient thickness and homogeneity to change the perceptible color of the particulate core. In another preferred embodiment, at least about 30%, preferably at least about 60%, more preferably at least about 90%, most preferably at least about 98% of the pigment of the extended composition is positioned directly on the core particles.

As the weight cost of the pigment generally far exceed the cost of the extender, the pigment:extender weight ratio is minimized while retaining advantageous photo/chemical/physical properties. The pigment:extender weight ratio is typically in the range of about 10 to 60%, thought preferably less than about 40%, more preferably less than about 25%.

Virtually any pigment may be used in the subject methods and compositions. The choice is dictated largely by color requirements, chemical and physical properties such as stability and light fastness, coating ability, oil absorptivity, etc required for the selected application. Pigments include azo compounds, particularly mono- and di-arylides, pyrazolones and Naphthol-AS pigments, and toners. Exemplary pigments include C.I. pigment yellow #1–7, 9, 10, 60, 65, 65M, 73–75, with PY60, 65, 65M, and 73–75 being preferred and PY65 being a most preferred embodiment; C.I. pigment orange #1, 22–24, 56; c.i. pigment red #1–10, 14, 15, 18, 21, 22, 49, 63, 93, 112, 114; C.I. pigment blue #2, 10, 11, 25, 26; C.I. pigment green #1–4. Other useful pigments are selected from the Colour Index, 3rd Ed., 5 Vols and Revisions, The Society of Dyers and Colourists, London.

Preferred pigments are azo-pigments capable of being formed by azo-coupling a diazonium ion with a coupler which had been precipitated onto an inert inorganic core. Such azo-pigments are readily selected by dyeists of ordinary skill using treatises such as the Colour Index. According to a particularly preferred embodiment, the selected organic pigments are azo compounds are of the general structure:

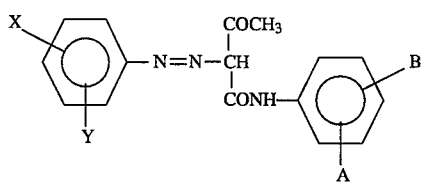

where X=H, F, Cl, Br, $NO_2$, $CF_3$, lower alkyl $C_nH_{2n+1}$; where n=1–4, lower alkoxy $OC_mH_{2m+1}$; where m=1–4; where Y=H, F, Cl, Br, $NO_2$, $CF_3$, lower alkyl $C_nH_{2n+1}$, where n=1–4, lower alkoxy $OC_mH_{2m+1}$; where m=1–4; where A= H, F, Cl, Br, $NO_2$, $CF_3$, lower alkyl $C_nH_{2n+1}$, where n=1–4, lower alkoxy $OC_mH_{2m+1}$; where m=1–4; where B=H, F, Cl, Br, $NO_2$, $CF_3$, lower alkyl $C_nH_{2n+1}$, where n=1–4, lower alkoxy $OC_mH_{2m+1}$; where m=1–4.

Exemplary preferred structures include:

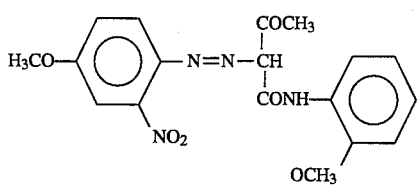

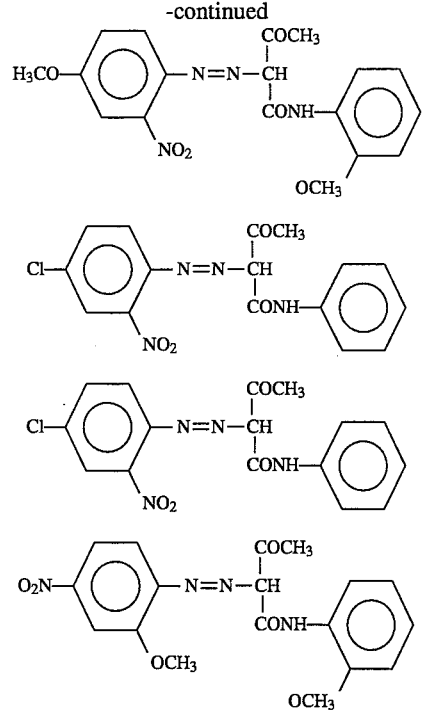

In addition to mono-arylide pigments, other extended pigments broaden the range of shades available, for instance from yellows to blues; for example, pyrazolone compounds of the structure:

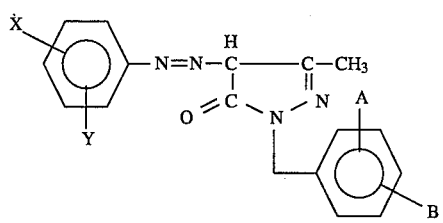

(where X has the same meaning as above) have shades ranging from yellow to orange.

Naphthol-AS pigments of the structure:

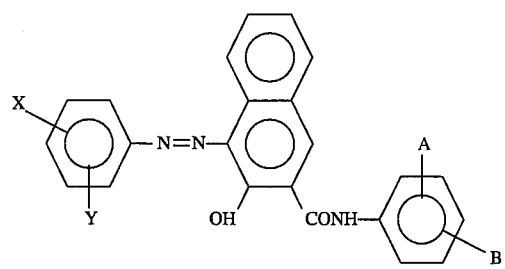

have shades ranging from orange to bluish red and even, using dianisidine, to blue.

In addition, various toners and lakes, such as those formed from certain cationic dyestuffs, and for example phosphomolybdotungstic acids and other polybasic acids, have useful brilliant blue to green shades. These pigments are known and are listed in the Colour Index which is incorporated by reference.

Suitable pigments are prepared or obtained by any convenient way known to those skilled in this art. For example, azo compounds are conveniently prepared by known methods of diazotization, using for example, sodium nitrite and mineral acid. Azo pigment coated cores may be provided by precipitating a coupler onto the core and subsequently react the core-bound coupler with the diazonium ion to produce a core-bound pigment. For example, particulate lithopone is mixed with a solution of a coupler such as acetoacetoaniside. A coupler precipitator, typically an acidifier, is then added in an amount sufficient to precipitate the coupler onto the lithopone. The lithopone-bound coupler is then reacted with a diazonium ion in an azo-coupling reaction to form a pigment. The pigment-lithopone complexes may then be heated (which may be used to affect a change in the core crystalline structure to modify opacity, oil absorbtivity, etc.) and coated with a rosin or modified rosin soap. To form the lithopone lakes of the invention, a toner is deposited directly onto a lithopone core by first forming a lithopone-soluble dye mixture. The dye is precipitated as a toner onto the lithopone by adding a precipitator such as calcium or barium ions. Exemplary preparation, coating and rosinating methods are illustrated in greater detail by the following examples, which are offered by way of illustration and not by way of limitation.

EXAMPLES 16.8 g 4-amino-2-nitroanisole is stirred with 35 g hydrochloric acid 30% until a smooth paste is obtained. 40 g ice is added, followed by 6.9 g sodium nitrite dissolved in 20 ml water. The mass is stirred at 5°–10° C. for 1 hour, then 1 g activated carbon is added and the diazonium solution is clarified by filtering through filter paper. 19.3 g acetoaceto-anisidide is dissolved in 200 ml water by the addition of 14.8 g sodium hydroxide solution 30%. A suspension of 112 g lithopone (Colour Index Pigment White 5) in 500 ml water is added and the pH is adjusted to 4.5 by the addition of about 6.6 g glacial acetic acid. After removing the excess nitrite in the diazo solution by the addition of urea or sulfamic acid, the coupling is effected by adding this diazo solution to the suspension during about 1 hour. After completion of the coupling, the reaction mass is heated to 60° C. and 1 g rosin dissolved at pH 12 with sodium hydroxide is added. The reaction mass is heated to 90° C., held at this temperature for 1 hour, then filtered and washed salt-free. The pigment is dried at 90° C. to obtain a soft yellow powder. The organic constituent has the structure:

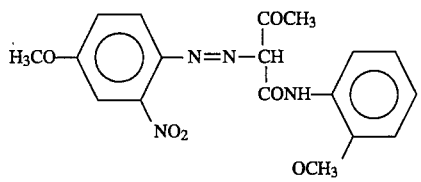

The organic pigments of the present invention offer dramatic cost and material savings over commonly used pigments. Yet another important advantage over currently used inorganic pigments, particularly lead chromate, since—being free of regulated heavy metals—their use in paints, inks, adhesives, rubbers, elastomers, etc., especially traffic marking paint is environmentally preferred. Furthermore, the invention provides non-metameric pigment compositions, i.e. the shade may be substantially the same under different illuminants. This property is of particular importance in traffic paints, which are required to be comparably visible in both daylight and under artificial illumination.

Accordingly, the invention provides methods and compositions for marking roads and traffic surfaces, including pedestrian, bicycle and, especially, motor vehicle traffic surfaces. Typically, the surface is first prepared for paint application to provide an adherent surface. Preparation may include removal of loose debris such as dust, sand, etc. (e.g. with water or air pressure/vacuum or mechanical sweeping), removal of oil (e.g. with a detergent wash), drying, providing a sealer, typically an water barrier, and/or a priming coating, etc. Paint application is typically made under air or gas pressure through a directed restriction nozzle.

All publications and patent applications cited in this specification are herein incorporated by reference as if each individual publication or patent application were specifically and individually indicated to be incorporated by reference.

Although the foregoing invention has been described in some detail by way of illustration and example for purposes of clarity of understanding, it will be readily apparent to those of ordinary skill in the art in light of the teachings of this invention that certain changes and modifications may be made thereto without departing from the spirit or scope of the appended claims.

What is claimed is:

1. A method for producing an extended organic pigment composition said method comprising:

forming a lithopone-coupler mixture by contacting a particulate lithophone with a coupler;

adding to said mixture a coupler precipitator in an amount sufficient to decrease the solubility of said coupler in said mixture and to precipitate said coupler onto said lithopone, to form a coupler-coated lithopone;

contacting said coupler-coated lithopone with a diazonium ion capable of reacting with said coupler of said coupler-coated lithopone in an azo-coupling reaction to form a pigment, to react said diazonium ion with said coupler in a azo coupling reaction, whereby an extended organic pigment composition comprising an organic azo pigment-coated lithopone is formed.

2. An extended organic pigment composition produced by a method according to claim 1.

3. A method according to claim 1 wherein said azo pigment comprises a mono-arylide.

4. A composition according to claim 2 wherein said azo pigment comprises a mono-arylide.

5. A composition according to claim 2 wherein said core further comprises a colorant.

6. A composition according to claim 2, wherein said core further comprises a colorant comprising a metal oxide or metal salt.

7. A paint, adhesive, elastomer, rubber or ink composition comprising the composition of claim 2.

8. A traffic marking paint comprising the composition of claim 2.

9. A traffic marking paint comprising the composition of claim 2 wherein said paint is polyester, acrylic, latex, or epoxy based.

10. A method of marking roads comprising applying to said road a composition according to claim 2.

11. A method for producing an extended organic azo-pigment composition comprising an inner core of lithopone coated with an organic azo-pigment, wherein said pigment comprises pigment yellow 65 or 65M said method comprising:

forming a lithopone-coupler mixture by contacting a particulate lithophone with a coupler;

adding to said mixture a coupler precipitator in an amount sufficient to decrease the solubility of said coupler in said mixture and to precipitate said coupler onto said lithopone, to form a coupler-coated lithopone;

contacting said coupler-coated lithopone with a diazonium ion capable of reacting with said coupler of said coupler-coated lithopone in an azo-coupling reaction to form a pigment, to react said diazonium ion with said coupler in a diazonium reaction, whereby an extended organic pigment composition comprising an organic azo pigment-coated lithopone, wherein said pigment comprises pigment yellow 65 or 65M, is formed.

12. A method according to claim 11, wherein said precipitator is added to an aqueous solution comprising said mixture, and said precipitator effects a reduction of the pH of said aqueous solution.

13. An extended organic pigment composition produced by a method according to claim 12.

14. A method according to claim 11 further comprising contacting said pigment-coated lithopone with a rosin or modified rosin soap, whereby an extended organic pigment composition comprising a rosin-covered, organic azo pigment-coated lithopone is formed.

15. An extended organic pigment composition produced by a method according to claim 14.

16. A composition according to claim 15 wherein said core further comprises a colorant.

17. A paint, adhesive, elastomer, rubber or ink composition comprising the composition of claim 15.

18. A traffic marking paint comprising the composition of claim 15.

19. A traffic marking paint comprising the composition of claim 15 wherein said paint is polyester, acrylic, latex or epoxy based.

20. A method of marking roads comprising applying to said road a composition according to claim 15.

* * * * *

UNITED STATES PATENT AND TRADEMARK OFFICE
CERTIFICATE OF CORRECTION

PATENT NO. : 5,472,492  
DATED : December 15, 1995  
INVENTOR(S) : Issel et al.

Page 1 of 1

It is certified that error appears in the above-identified patent and that said Letters Patent is hereby corrected as shown below:

<u>Title page,</u>
Item [75], Inventors, please correct inventors name "Quilin Wang" to -- Guilin Wang--.

Signed and Sealed this

Fourteenth Day of August, 2001

Attest:

NICHOLAS P. GODICI
*Attesting Officer*     *Acting Director of the United States Patent and Trademark Office*